United States Patent
Reilly

(10) Patent No.: US 6,430,756 B1
(45) Date of Patent: Aug. 13, 2002

(54) CLOSET BOLT

(76) Inventor: George W. Reilly, 6 Hemlock Rd., West Nyack, NY (US) 10994

(*) Notice: Subject to any disclaimer, the term of this patent is extended or adjusted under 35 U.S.C. 154(b) by 0 days.

(21) Appl. No.: 09/221,543

(22) Filed: Dec. 28, 1998

(51) Int. Cl.[7] .............................................. E03D 11/00
(52) U.S. Cl. .................... 4/252.1; 411/395; 411/403
(58) Field of Search ............................... 4/252.1, 252.4, 4/252.5; 411/395, 403, 410

(56) References Cited

U.S. PATENT DOCUMENTS

| | | | |
|---|---|---|---|
| 161,390 A | * 11/1875 | Cummings | 411/407 |
| 452,640 A | * 5/1891 | Gerry | 411/403 |
| 1,507,488 A | 9/1924 | Kraemer | |
| 1,545,839 A | 7/1925 | Mason | |
| 1,548,850 A | 8/1925 | Rudolph | |
| 2,781,073 A | 2/1957 | Trafton | |
| 3,180,660 A | 4/1965 | Brewington | |
| 3,339,215 A | 9/1967 | Flood | |
| 3,424,212 A | * 1/1969 | Kemper | 411/395 |
| 3,457,573 A | 7/1969 | Patyna et al. | |
| 3,669,171 A | 6/1972 | Yavitch | |
| 4,227,722 A | 10/1980 | Barber | |
| 4,530,629 A | 7/1985 | Sakow | |
| 4,784,554 A | 11/1988 | Break | |
| 4,850,063 A | 7/1989 | Abbate | |
| 4,907,301 A | 3/1990 | Tucker | |
| 4,907,923 A | 3/1990 | McGrath, Jr. | |
| 4,924,533 A | 5/1990 | Stairs, Jr. | |
| 5,169,400 A | 12/1992 | Muhling et al. | |
| 5,222,851 A | 6/1993 | Dickerson | |
| 5,421,036 A | 6/1995 | Stevens et al. | |
| 5,549,431 A | 8/1996 | Royle | |

FOREIGN PATENT DOCUMENTS

| | | |
|---|---|---|
| CA | 2053542 | 4/1993 |
| DE | 43 20 790 | 5/1995 |

* cited by examiner

Primary Examiner—Robert M. Fetsuga
(74) Attorney, Agent, or Firm—Anthony J. Casella; Gerald E. Hespos

(57) ABSTRACT

A closet bolt is provided for mounting a toilet bowl to a specific installation. The closet bowl has a cylindrical shaft in which a hollow passage is formed. The hollow passage advantageously facilitates shortening of the closet bolt through cutting. Also, the hollow passage may be formed with a non-circular cross-section which can be engaged by a similarly-shaped tool to prevent unwanted rotation of the closet bolt.

4 Claims, 2 Drawing Sheets

CLOSET BOLT

BACKGROUND OF THE INVENTION

1. Field of the Invention

This invention relates to hardware for mounting toilet bowls, and, more particularly, closet bolts.

2. Description of the Prior Art

The typical manner of mounting a toilet bowl rigidly to a floor and in communication with a soil pipe relies on the use of "IT" shaped closet bolts, such as that shown in FIG. 1. Specifically, FIG. 1 depicts a standard closet bolt 1 having a planar flange 2, and a solid threaded shaft 3 extending from the flange 2.

To mount a toilet bowl to a particular installation, a soil flange, having arcuate slots formed therein, is first disposed about the soil pipe. A closet bolt (usually two are utilized) is inserted through each of the arcuate slots with the flange leading and disposed to have the threaded shaft extending upwardly through the arcuate slot. In this position, the closet bolts are each freely rotatable, with the shaft able to twist within the arcuate slot and the flange being unobstructed to rotate therewith. A sealing ring is then disposed about the mouth of the soil pipe, and a toilet bowl is placed atop the prepared assembly. Pre-fabricated holes are formed in the base of the toilet bowl through which the closet bolts pass. To secure the toilet bowl in place, nuts are threadedly mounted onto the closet bolts and forced into tight bearing engagement against the base of the toilet bowl causing the flanges of the closet bolts to be urged into bearing engagement with the underside of the soil flange. It is to be understood that the above-described method of installing a toilet bowl has been limited for this discussion, and many other steps are required, including, but not limited to, preparing a bed of plaster or grout below the toilet bowl base to ensure a level mounting surface, assembling a water tank, and mounting the water tank.

Two problems are commonly associated with the use of typical prior art closet bolts. First, the portion of the threaded shaft of each of the closet bolts which protrudes from the nut in a locked position is commonly cut off using a metal hack saw or an electrically-powered reciprocating saw to make the end of the threaded shaft flush with the top of the nut. The removal of the protruding portions of closet bolts not only presents a more aesthetically-pleasing appearance, but also reduces the chances of a shower curtain or a person's clothing getting caught on the closet bolt and being damaged. Since the threaded shaft of the prior art closet bolt is made solid, the shortening of the closet bolt is a difficult task, which is made more difficult due to the proximity of the toilet bowl body to the cutting location, and the small confines of a typical bathroom. To address this problem, closet bolts have been formed in the prior art with scorelines to allow for predetermined lengths of the closet bolt to be broken off without sawing, as in U.S. Pat. No. 3,339,215 which issued on Sep. 5, 1967 to Flood, entitled "SELF-RETAINING CLOSET BOLT", and U.S. Pat. No. 4,530,269, which issued on Jul. 23, 1985 to Sakow, entitled "TOILET BOWL MOUNTING BOLT ASSEMBLY". Alternatively, the prior art includes a variable length closet bolt, which is caused to be fully seated within an assembly rather than be cut, as in U.S. Pat. No. 5,421,036 which issued on Jun. 6, 1995 to Stevens et al., entitled "WATER CLOSET INSTALLATION SYSTEM". Both of these solutions are deficient. Specifically, with respect to the former solution, the closet bolt is broken at one of the pre-defined scorelines, which may not necessary result in the end of the shaft being flush with the top of the nut. With respect to the latter solution, the closet bolt is formed from two different components, where care must be exercised at a work site to not lose one of the components.

A second problem associated with prior art closet bolts is the inability thereof to non-rotatably engage the soil flange. During installation, an installer is able to prevent rotation of a closet bolt by gripping the protruding end of the threaded shaft with a pair of pliers, or other tool, to hold the closet bolt in a fixed position and allow the nut to be tightened. However, to achieve the removal of an installed toilet bowl or an installed closet bolt, the installed nut must be removed, which may be troublesome. In particular, as described above, since the threaded shaft of the closet bolt is typically made flush with the top surface of the nut, there is no protruding portion of the closet bolt to grip. Thus, upon rotating the nut, the entire nut and closet bolt assembly rotates. Often, a person will press a screw driver or other tool against the exposed cut surface of the threaded shaft to apply pressure thereto in an attempt to prevent rotation of the closet bolt, and then attempt to loosen the nut. Unfortunately, the screw driver, or other tool pressed against the closet bolt, frequently slips and damages the toilet bowl during the nut removal procedure. Moreover, the removal of the nut is made more difficult due to corrosion which sets in over time. In cases where removal of the nut is extremely difficult, the nut and/or closet bolt are destroyed by sawing or drilling. As a solution to this problem, non-rotating closet bolts are provided in the prior art, such as U.S. Pat. No. 4,850,063, which issued on Jul. 25, 1989 to Abbate, entitled "WATER CLOSET FASTENER", and U.S. Pat. No. 5,222,851, which issued on Jun. 29, 1993 to Dickerson, entitled "CLOSET BOLT ASSEMBLY". Both of these solutions, however, require closet bolts formed from several components.

It is an object of the subject invention to provide a closet bolt which facilitates shortening thereof.

It is also an object to the subject invention to provide a closet bolt adapted to prevent rotation thereof.

SUMMARY OF THE INVENTION

The above-stated objects are met by a closet bolt having a generally "IT" shaped body with a planar flange at one end, a threaded shaft extending from the flange to define a free end, and a hollow passage formed in the threaded shaft extending from the free end towards the flange. Preferably, the hollow passage defines a non-circular cross-section, and, more preferably, the hollow passage defines a hexagonal cross-section into which a hex wrench can be inserted.

In use, the closet bolt of the subject invention can be utilized in the customary manner to mount a toilet bowl. Additionally, the closet bolt is easier to cut to length than prior art closet bolts due to the reduction of cross-sectional material needed to define the hollow passage. Also, a tool, which is similarly shaped to the cross-section of the hollow passage, can be inserted into the hollow passage to prevent rotation thereof. Preferably, the hollow passage extends sufficiently through the threaded shaft so that, even where the closet bolt is cut to be made flush with a nut tightened thereabout, the hollow passage is still defined in the threaded shaft. Consequently, the closet bolt of the subject invention can be used to mount a toilet bowl in the customary manner, be cut easier and quicker than prior art closet bolts, and have rotation thereof prevented to allow for easy removal of an installed nut.

These and other features of the invention will be better understood through a study of the following detailed description and accompanying drawings.

DETAILED DESCRIPTION OF THE INVENTION

Figure 1:
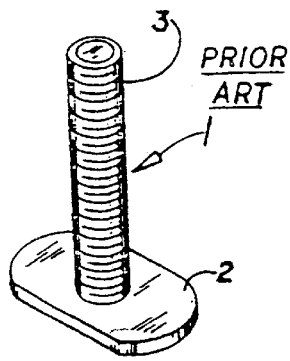
FIG. 1 is a perspective view of a prior art closet bolt.
Figure 2:
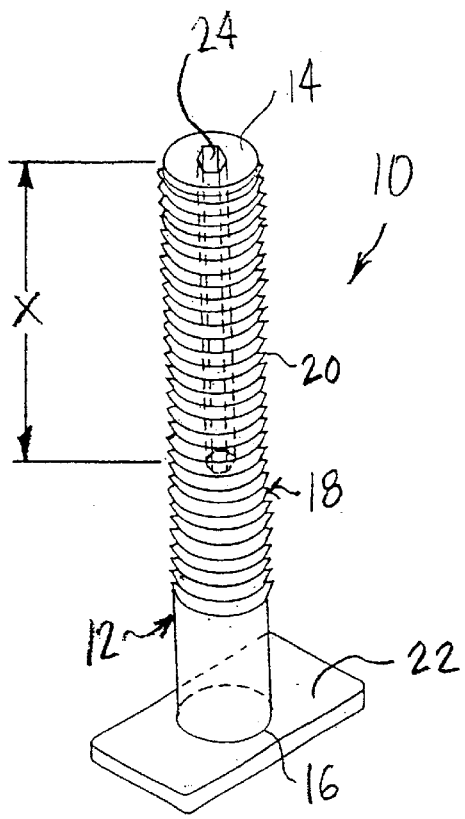
FIG. 2 is a perspective view of a first embodiment of a closet bolt formed in accordance with the subject invention.
Figure 3:
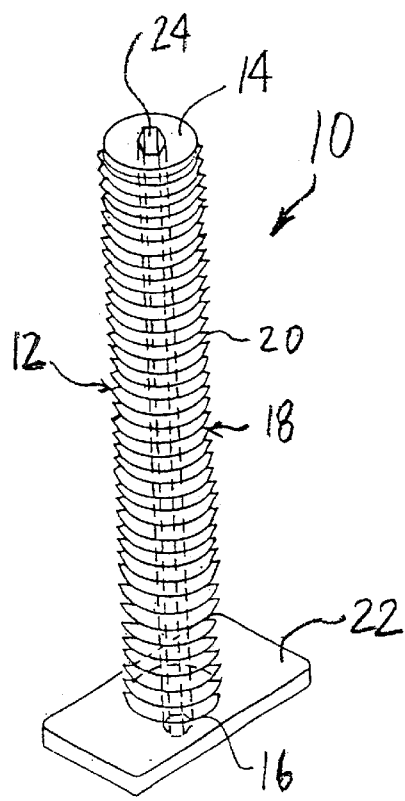
FIG. 3 is a perspective view of a second embodiment of a closet bolt formed in accordance with the subject invention.

Referring generally to the FIGS., a closet bolt 10 is shown used for mounting a toilet bowl into a specific installation. The closet bolt 10 is formed with a generally cylindrical shaft 12 having a free end 14, a base end 16 and a body 18 extending therebetween. The body 18 is generally formed with the same cross-section throughout, and threads 20 are formed on the outer surface of the body 18 either to extend along a substantial portion of the body 18 from the free end 14 as shown in FIG. 2, or, alternatively, as shown in FIG. 3, along the full length of the body 18. A planar flange 22 is unitarily connected to and extends from the base end 16. With this arrangement of the shaft 12 and the flange 22, the closet bolt 10 has a generally "IT" shape.

A hollow passage 24 is formed to extend from the free end 14 and into the body 18 to define a length "x". Preferably, as described below, the length "x" is selected to have the hollow passage 24 extend below the top face of a nut when installed. As is readily apparent, the hollow passage 24 can be formed, as shown in FIG. 3, to extend the full length of the shaft 12 and through the flange 22. As such, the hollow passage 24 extends completely through the closet bolt 10.

Figure 6:
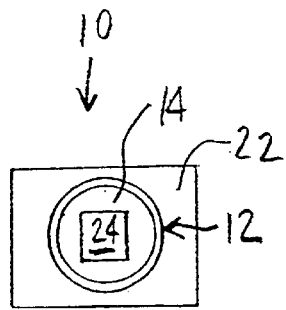
FIG. 6 is a top view of the closet bolt of the subject invention formed with a hollow passage having a rectangular cross-section.
Figure 7:
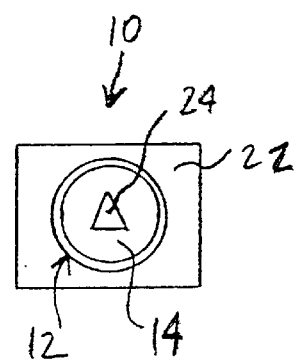
FIG. 7 is a top view of the closet bolt of the subject invention formed with a hollow passage having a triangular cross-section.

As shown in the FIGS., the hollow passage 24 is preferably formed to define a non-circular cross-section. More preferably, as shown in FIGS. 2–5, the hollow passage 24 defines a hexagonal cross-section which is shaped and dimensionsed to receive a similarly-shaped shank 26 of a hex wrench H to prevent rotation of the closet bolt 10. The hexagonal cross-sectional shape is most preferred due to the widespread use and availability of hex wrenches. Alternatively, the hollow passage 24 can be formed with other non-circular cross-sections, such as, as shown in FIG. 6, a rectangular cross-section, or, as shown in FIG. 7, a triangular cross-section. For each non-circular cross-sectional shape, a similarly-shaped tool must be provided which can be inserted into the hollow passage 24 to prevent rotation of the closet bolt 10, as described below. To this end, it is preferred that the tool be formed with the same cross-sectional shape as the hollow passage 24, but with slightly smaller dimensions to allow for insertion of the tool into the hollow passage 24.

Figure 4:
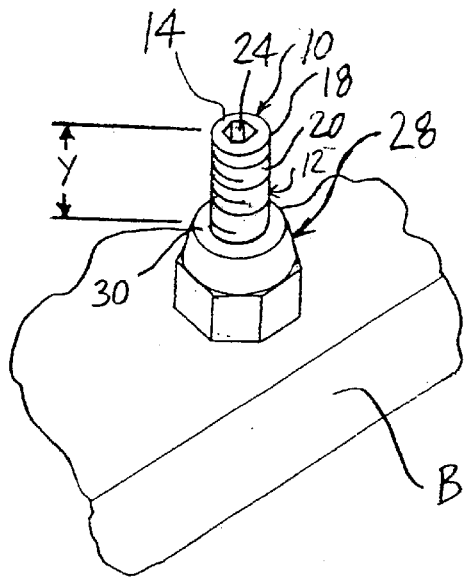
FIG. 4 is a perspective view of the closet bolt of the subject invention installed in the base of a toilet bowl.

In use, the closet bolt 10 is utilized in the same customary manner as the prior art closet bolts to mount a toilet bowl to a specific installation. As shown in FIG. 4, the closet bolt 10 extends through a base B of the toilet bowl and has a nut 28 threadedly engaged thereabout. The nut 28 is tightened to be in bearing engagement against the base B. As is readily apparent, the threads 20 are provided along a sufficient length of the body 18 to allow for full threaded engagement with the nut 28 in a locked and installed position. As installed, the free end 14 of the shaft 12 is spaced a distance "y" from a top face 30 of the nut 28. In the preferred embodiment of the invention, the length "x" is greater than the distance "y" to ensure that the hollow passage 24 extends below the top face 30. Once installed, the portion of the shaft 12 which extends above the top face 30 may be cut to be flush with the top face 30. The reduced amount of cross-sectional material of the shaft 12 needed to define the hollow passage 24 makes the task of cutting the shaft 12 easier than in the prior art.

Figure 5:
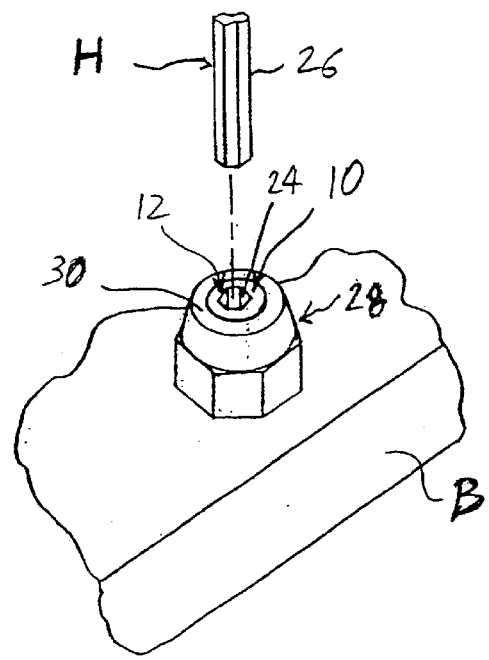
FIG. 5 is a perspective of the closet bolt of the subject invention having the threaded shaft cut to be flush with the top surface of a nut.

FIG. 5 shows the closet bolt 10 having been cut with the end of the shaft 12 being substantially flush with the top face 30 of the nut 28. Prior to cutting the shaft 12, the portion of the shaft 12 which protrudes from the nut 28 may be gripped to allow for proper tightening of the nut 28 onto the closet bolt 10. Once the shaft 12 is cut, to remove the nut 28, the hex wrench H is introduced and the shank 26 is inserted into the hollow passage 24. As the hex wrench H is rigidly held, torque is applied to the nut 28 to cause rotation of the nut 28 relative to the closet bolt 10. As such, the nut 28 can be loosened. The hex wrench H can also be used in tightening the nut 28 on the closet bolt 10.

As is readily apparent, numerous modifications and changes may readily occur to those skilled in the art, and hence, it is not desired to limit the invention to the exact construction and operation as shown and described, and, accordingly, all suitable modification equivalents may be resorted to falling within the scope of the invention as claimed.

What is claimed is:

1. A closet bolt assembly for securing a toilet bowl flange to a fixed ring below the toilet bowl, said ring having a slot therein and said toilet bowl flange having a hole extending therethrough, said closet bolt assembly comprising:

a nut; and a closet bolt having a cylindrical shaft with opposed first and second ends, a planar flange integrally connected to the second end of said cylindrical shaft and disposed generally perpendicular to the longitudinal axis thereof for engaging the fixed ring, with the outer surface of said cylindrical shaft being threaded from said first end to a point intermediate the length thereof a sufficient distance for engaging said nut to said closet bolt to secure said toilet bowl flange to said ring, said cylindrical shaft having a hollow passage extending from said first end toward said second end thereof, said hollow passage being of non-circular cross-section whereby when an elongated tool of corresponding cross-section to said hollow passage is disposed within said hollow passage of the cylindrical shaft, the closet bolt may be restrained from rotation to enable said nut to be threadedly tightened on and threadedly screwed off of said cylindrical shaft.

2. A combination as in claim 1, wherein said hollow passage defines a hexagonal cross-section.

3. A combination as in claim 1, wherein said outer surface of said shaft is completely threaded.

4. A combination as in claim 1, wherein said hollow passage extends fully through said shaft and said flange.

* * * * *